United States Patent
Kim

(10) Patent No.: US 10,638,195 B2
(45) Date of Patent: Apr. 28, 2020

(54) ELECTRONIC APPARATUS AND CONTROL METHOD THEREOF

(71) Applicant: SAMSUNG ELECTRONICS CO., LTD., Suwon-si (KR)

(72) Inventor: Tae-soo Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 45 days.

(21) Appl. No.: 15/919,476

(22) Filed: Mar. 13, 2018

(65) Prior Publication Data
US 2018/0270539 A1   Sep. 20, 2018

(30) Foreign Application Priority Data

Mar. 14, 2017   (KR) ................ 10-2017-0032074

(51) Int. Cl.
| | | |
|---|---|---|
| H04N 21/472 | (2011.01) | |
| H04L 29/08 | (2006.01) | |
| H04N 21/845 | (2011.01) | |
| H04N 21/61 | (2011.01) | |

(Continued)

(52) U.S. Cl.
CPC ... H04N 21/47217 (2013.01); H04L 29/0809 (2013.01); H04L 67/02 (2013.01);
(Continued)

(58) Field of Classification Search
CPC ......... H04N 21/26258; H04N 21/4622; H04N 21/47202; H04N 21/47217;
(Continued)

(56) References Cited

U.S. PATENT DOCUMENTS

| | | | | | |
|---|---|---|---|---|---|
| 5,826,166 | A | * | 10/1998 | Brooks | H04N 7/17318 725/134 |
| 2007/0113243 | A1 | * | 5/2007 | Brey | G06Q 30/02 725/32 |

(Continued)

FOREIGN PATENT DOCUMENTS

| | | |
|---|---|---|
| KR | 10-2009-0072108 A | 7/2009 |
| WO | 2007/059385 A2 | 5/2007 |

OTHER PUBLICATIONS

International Search Report (PCT/ISA/210) and Written Opinion (PCT/ISA/237) dated Jul. 4, 2018, issued by the International Searching Authority in International Application No. PCT/KR2018/002809.

(Continued)

Primary Examiner — Nicholas T Corbo
(74) Attorney, Agent, or Firm — Sughrue Mion, PLLC

(57) ABSTRACT

An electronic apparatus is provided. The electronic apparatus includes a receiver, a signal processor, a display and a controller. The receiver is configured to receive a first and second broadcast signals. The signal processor is configured to process a content included in a received broadcast signal. The controller is configured to control the signal processor to perform, based on protocol information of the received broadcast signal, a first preprocess corresponding to the first protocol to the first broadcast signal in response to the received broadcast signal being the first broadcast signal and a second preprocess corresponding to the second protocol to the second broadcast signal in response to the received broadcast signal being the second broadcast signal, and perform, based on playback information about the content included in the received broadcast signal, a single mode of decoding with respect to the content extracted from the received broadcast signal.

19 Claims, 10 Drawing Sheets

(51) Int. Cl.
  *H04N 21/643* (2011.01)
  *H04N 21/462* (2011.01)
  *H04W 4/06* (2009.01)
  *H04N 21/262* (2011.01)

(52) U.S. Cl.
  CPC ... *H04N 21/26258* (2013.01); *H04N 21/4622* (2013.01); *H04N 21/47202* (2013.01); *H04N 21/6112* (2013.01); *H04N 21/6125* (2013.01); *H04N 21/643* (2013.01); *H04N 21/8456* (2013.01); *H04W 4/06* (2013.01)

(58) Field of Classification Search
  CPC ........... H04N 21/6112; H04N 21/6125; H04N 21/643; H04N 21/8456; H04L 29/0809; H04L 67/02; H04W 4/06
  See application file for complete search history.

(56) References Cited

U.S. PATENT DOCUMENTS

| | | |
|---|---|---|
| 2009/0013363 A1 | 1/2009 | Lee et al. |
| 2013/0293677 A1 | 11/2013 | Lee et al. |
| 2015/0281799 A1 | 10/2015 | Lim |
| 2016/0127756 A1 | 5/2016 | Oh et al. |
| 2016/0261665 A1 | 9/2016 | Stockhammer et al. |
| 2016/0359744 A1 | 12/2016 | Kwak et al. |
| 2017/0055046 A1* | 2/2017 | Lee ................... H04N 21/234 |

OTHER PUBLICATIONS

Communication dated Dec. 6, 2019 issued by the European Patent Office in counterpart European Application No. 18766595,3.

* cited by examiner

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2017-0032074, filed on Mar. 14, 2017 in the Korean Intellectual Property Office, the disclosure of which is incorporated by reference herein in its entirety.

BACKGROUND

Field

The disclosure relates to an electronic apparatus and a control method thereof, and more particularly to an electronic apparatus, which receives a broadcast signal in various ways and provides a content, and a control method thereof.

Description of Related Art

An electronic apparatus, such as a television (TV) or a set-top box, receives a broadcast signal corresponding to a channel selected from among a plurality of broadcast signals and provides a content based on the received broadcast signal.

The broadcast signal may be transmitted by the broadcast station according to various methods, and the electronic apparatus may receive the broadcast signal according to a corresponding method.

One method of transmitting the broadcast signal is a real time object delivery over unidirectional transport (ROUTE) protocol, which is recently being studied and is designed to use a dynamic adaptive streaming over HTTP (DASH) player. The DASH player is capable of playing media data stored in a server by receiving playback information from the server, requesting a content using the playback information, and providing the received content.

To play data received with the DASH player via the ROUTE protocol, the electronic apparatus should be provided with a local hypertext transfer protocol (HTTP) server. The local HTTP server stores media data and playback information included in the broadcast signal and the DASH player accesses to the local HTTP server using the playback information to download and provide the media data.

However, there is a problem in that the unnecessary process is added to causes overhead.

SUMMARY

Embodiments address at least the above problems and/or disadvantages and other disadvantages not described above. Also, the embodiments are not required to overcome the disadvantages described above, and may not overcome any of the problems described above.

Provided are an electronic apparatus, which omits a process to additionally store a received broadcast signal and to access to and download the stored broadcast signal, thereby providing enhanced signal processing efficiency, and a control method thereof.

In accordance with an aspect of the disclosure, there is provided an electronic apparatus including: a receiver configured to receive a first broadcast signal of a first protocol and a second broadcast signal of a second protocol, the first broadcast signal being transmitted according to a first method and the second broadcast signal being transmitted according to a second method different from the first method; a signal processor configured to process a content included in a received broadcast signal; a display configured to display the processed content; and a controller configured to control the signal processor to: perform, based on protocol information of the received broadcast signal, a first preprocess corresponding to the first protocol to the first broadcast signal in response to the received broadcast signal being the first broadcast signal and a second preprocess corresponding to the second protocol to the second broadcast signal in response to the received broadcast signal being the second broadcast signal, and perform, based on playback information about the content included in the received broadcast signal, a single mode of decoding with respect to the content extracted from the received broadcast signal.

The controller may be further configured to control the signal processor to extract content data and the playback information about the content from the second broadcast signal, extract a playback time point of the content data from the playback information, and perform the decoding with respect to the content data based on the playback time point.

The playback information may include at least one of among a playback start time of the content data, a total playback time of the content data, index information of the content data, and codec information of the content data.

The content data may include an initialization segment, a media segment and an index segment.

The controller may be further configured to, in response to a file being included in the second broadcast signal, control the signal processor to extract the file and execute instructions of the file.

The electronic apparatus may further include: a communicator configured to receive a third broadcast signal transmitted via a network from an external server, and the controller may be further configured to request, based on third broadcast playback information included in the third broadcast signal, the external server to send a third broadcast content corresponding to the third broadcast playback information, and control the signal processor to process the third broadcast content received according to the request.

The first protocol may correspond to a MPEG media transport protocol (MMTP) method and the second protocol may correspond to a real time object delivery over unidirectional transport (ROUTE) method.

In accordance with an aspect of the disclosure, there is provided a control method of an electronic apparatus including: receiving a first broadcast signal of a first protocol and a second broadcast signal of a second protocol, the first broadcast signal being transmitted according to a first method and the second broadcast signal being transmitted according to a second method different from the first method; processing a content included in a received broadcast signal; and displaying the processed content, the processing including: performing, based on protocol information of the received broadcast signal, a first preprocess corresponding to the first protocol to the first broadcast signal in response to the received broadcast signal being the first broadcast signal and a second preprocess corresponding to the second protocol to the second broadcast signal in response to the received broadcast signal being the second broadcast signal, and performing, based on playback information about the content included in the received broadcast signal, a single mode of decoding with respect to the content extracted from the received broadcast signal.

The performing the second preprocess corresponding to the second protocol to the second broadcast signal may include extracting content data and the playback information about the content from the second broadcast signal, and extracting a playback time point of the content data from the playback information, and the performing the single mode of decoding may include performing the decoding with respect to the content data based on the playback time point.

The playback information may include at least one of among a playback start time of the content data, a total playback time of the content data, index information of the content data, and codec information of the content data.

The content data may include an initialization segment, a media segment and an index segment.

The processing the content included in the received broadcast signal may include extracting, in response to a file being included in the second broadcast signal, and executing instructions of the file.

The control method may further include: receiving a third broadcast signal transmitted via a network from an external server; requesting, based on third broadcast playback information included in the third broadcast signal, the external server to send a third broadcast content corresponding to the third broadcast playback information; and processing the third broadcast content received according to the request.

The first protocol may include a MPEG media transport protocol (MMTP) method and the second protocol may include a real time object delivery over unidirectional transport (ROUTE) method.

In accordance with an aspect of the disclosure, there is provided a non-transitory computer readable medium having a computer program stored thereon, the computer program containing one or more instructions, which, when executed by a computing device, cause the computing device to execute a control method including: receiving a first broadcast signal of a first protocol and a second broadcast signal of a second protocol, the first broadcast signal being transmitted according to a first method and the second broadcast signal being transmitted according to a second method different from the first method; processing a content included in a received broadcast signal; and displaying the processed content. The processing including: performing, based on protocol information of the received broadcast signal, a first preprocess corresponding to the first protocol to the first broadcast signal in response to the received broadcast signal being the first broadcast signal and a second preprocess corresponding to the second protocol to the second broadcast signal in response to the received broadcast signal being the second broadcast signal, and performing, based on playback information about the content included in the received broadcast signal, a single mode of decoding with respect to the content extracted from the received broadcast signal.

The non-transitory computer readable medium may be in a server, and the computer program may be downloaded over a network to the computing device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS

Figure 1:
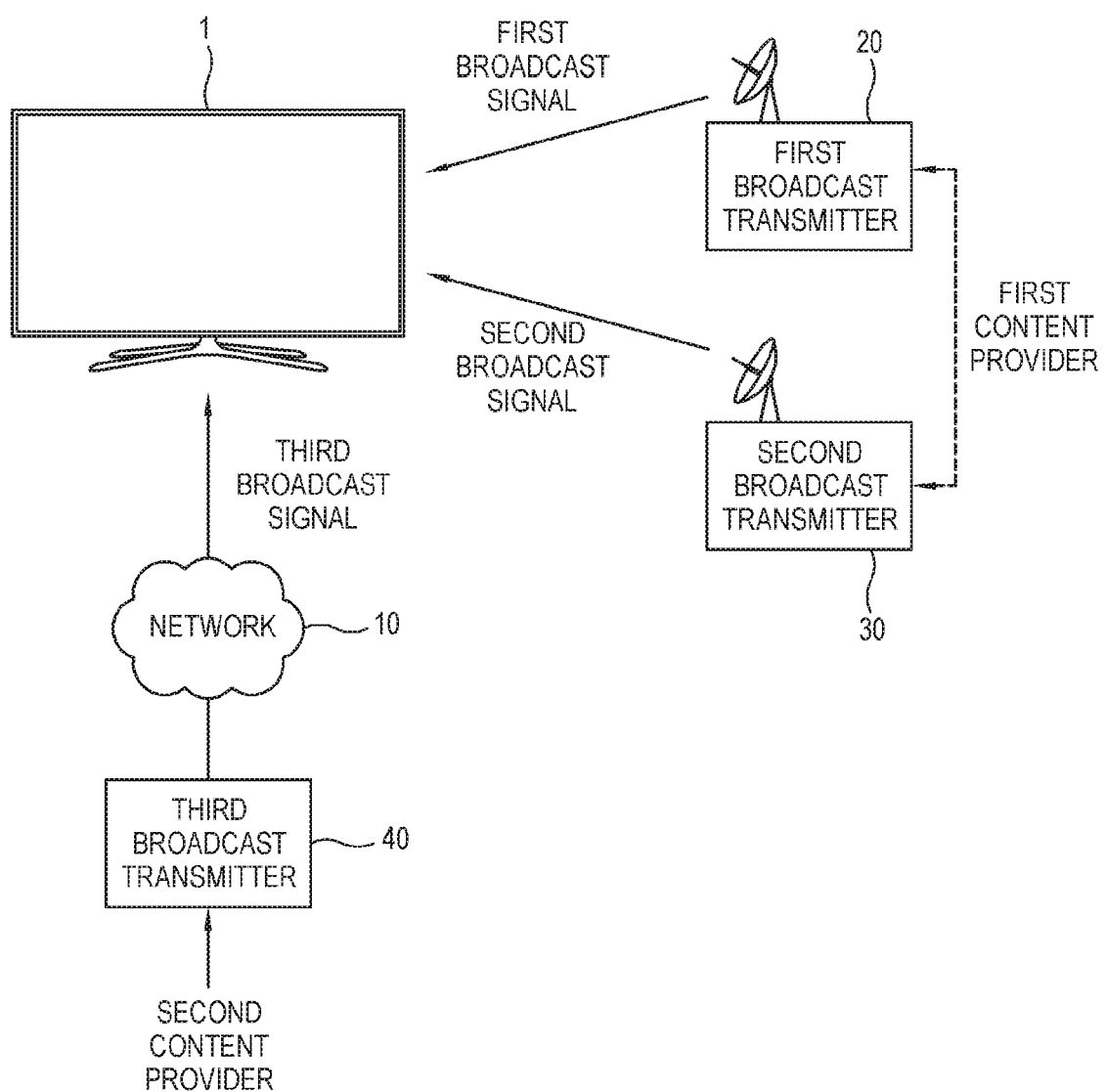
FIG. 1 illustrates an electronic apparatus according to an embodiment.

Hereinafter, embodiments will be described in detail with reference to accompanying drawings. Matters shown in the accompanying drawings are referred to in the following descriptions of the embodiments and for clarity, like reference numerals or symbols presented in respective drawings denote like elements, which substantially perform the same functions.

In the following description, if terminologies, each of which includes such an ordinal number as 'first', 'second' and the like, are used, those terminologies are used (unless expressly specified otherwise) merely to describe various elements. The terminologies are only used for the purpose of discriminating one element from other elements. In doing so, the various elements should be non-limited by the corresponding terminologies, respectively. The terminologies used in the following description of various embodiments are applied for explanation purpose only and not for the purpose of limiting the embodiments as defined by the appended claims and their equivalents.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 illustrates an electronic apparatus according to an embodiment. The electronic apparatus 1 according to an embodiment may be implemented as, for example, a television (TV). In other embodiments, the electronic apparatus 1 may be implemented as apparatuses capable of receiving a network signal to display a content, which include, for example, a smart phone, a tablet personal computer (PC), a mobile phone, a computer, a multimedia player, an electronic picture frame, a digital advertising board, a large format display (LFD), a digital signage, a set-top box, a wearable device such as a smart watch and a head-mounted display (HMD), a smart home appliance, such as a smart refrigerator, etc. However, the present disclosure is not limited thereto.

In an embodiment, the electronic apparatus 1 receives a first broadcast signal from a first broadcast transmitter 20. The first broadcast signal may be a terrestrial broadcast signal transmitted in a first protocol method. The electronic apparatus 1 receives a second broadcast signal from a second broadcast transmitter 30. The second broadcast signal may be a terrestrial broadcast signal transmitted in a second protocol method. Also, the electronic apparatus 1 receives a third broadcast signal from a third broadcast transmitter 40 via a network 10. The third broadcast transmitter 40 may be a network server. As an example of the network 10 between the electronic apparatus 1 and the third broadcast transmitter 40, there is an internet, but the present disclosure is not limited thereto. Each of the first, the second and the third broadcast signals (hereinafter, also referred to a 'broadcast signal') includes a content provided by a content provider of at least one channel, for example, a first content provider or a second content provider. The content may a TV program provided in real time, a video on demand (VOD) provided according a user request, etc., but the present disclosure is not limited thereto. Also, besides the content, each broadcast signal may include playback information about the content. For example, the playback information may include a playback time point of the content, a playback time of the content, signaling information for receiving the broadcast signal, information used to extract the content from the broadcast signal, program guide information to guide a use of the content, etc.

The number of each content provider illustrated in FIG. 1 may one, two or more than two. Also, each content provider is not referred to any one specific content provider, and the first content provider and the second content provider may be equal to or different from each other. For example, a 'broadcast station A' may provide a content via a first broadcast signal or a second broadcast signal of a 'channel A' as the first content provider and at the same time, a content via a third broadcast signal of a 'channel B' as the second content provider. That is, a content provider may provide the content through one selected from among the first broadcast signal and the second broadcast signal, which are terrestrial broadcast signals transmitted via different broadcast protocols, or provide the content through the third broadcast signal transmitted via the network 10. The first protocol of the first broadcast signal includes a MPEG media transport protocol (MMTP) (see a reference numeral 400 in FIG. 4) and the second protocol of the second broadcast signal includes a real time object delivery over unidirectional transport (ROUTE) protocol (see a reference numeral 401 in FIG. 4).

According to the related art, the second broadcast signal transmitted via the ROUTE protocol is played by a dynamic adaptive streaming over HTTP (DASH) player. To use the DASH player, the electronic apparatus according to the related art has a local HTTP server provided therein. The electronic apparatus according to the related art stores content data and playback information included in the second broadcast signal in the server. The DASH player is configured to access the HTTP server to receive and play the content by using information about a uniform resource locker (URL) of the HTTP server and a playback time point of the content.

However, the processing method of the second broadcast signal according to the related art as described above requires an unnecessary processing process, which stores the content data and the playback information in the server and downloads the content from the server to play the content. To address the problem of the related art, the electronic apparatus 1 according to an embodiment processes the second broadcast signal without using the DASH player, thereby more efficiently providing the content included in the second broadcast signal.

Figure 2:
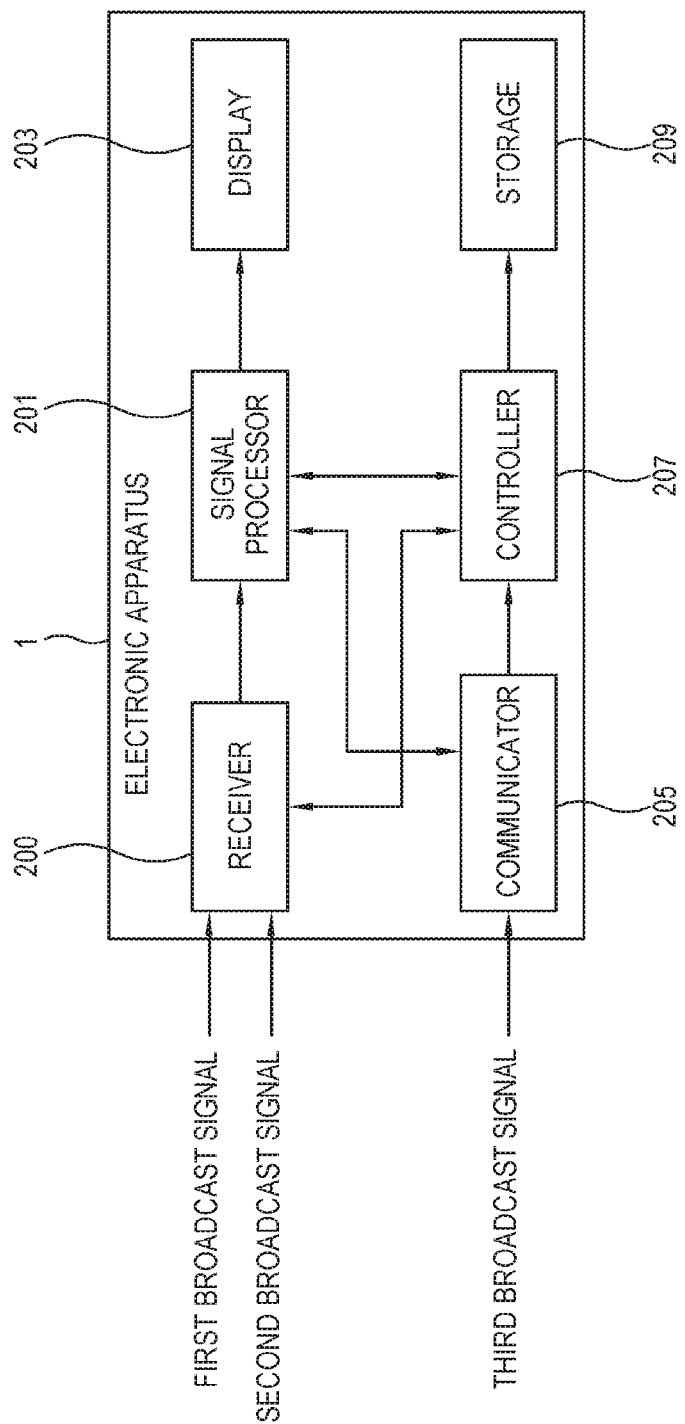
FIG. 2 is a block diagram illustrating a configuration of the electronic apparatus according to an embodiment.

FIG. 2 is a block diagram illustrating a configuration of the electronic apparatus according to an embodiment. The electronic apparatus 1 according to an embodiment includes a receiver 200, a signal processor 201, a display 203 and a controller 207. The electronic apparatus 1 according to an embodiment may further include at least one of a communicator 205 and a storage 209. The electronic apparatus 1 according to an embodiment as illustrated in FIG. 2 may be implemented as including additional elements other than those illustrated in FIG. 2 or removing any one from among elements illustrated in FIG. 2.

The receiver 200 receives the first broadcast signal transmitted from the first broadcast transmitter 20 or the second broadcast signal transmitted from the second broadcast transmitter 30. The receiver 200 may be provided with a tuner for receiving the first broadcast signal or the second broadcast signal. The tuner may tune and receive a broadcast signal of any one channel selected by the user from among a plurality of channels of the first broadcast signal or the second broadcast signal. Alternatively, the receiver 200 may include a first tuner for receiving the first broadcast signal and a second tuner for receiving the second broadcast signal. Whether the electronic apparatus 1 receives the first broadcast signal or the second broadcast signal is identified by protocol information of the received broadcast signal. The first broadcast signal and the second broadcast signal according to an embodiment may be a broadcast signal, which complies with, for example, an advanced television systems committee (ATSC) 3.0 standard. However, the standard of the first and second broadcast signals according to an embodiment is not limited thereto. As another embodiment, the receiver 200 may be configured to receive a broadcast signal from a broadcast signal receiving device for receiving the first broadcast signal or the second broadcast signal. As an example, the broadcast signal receiving device may be provided outside the electronic apparatus 1, so that it is connected with the receiver 200. The broadcast signal receiving device may receive the first broadcast signal or the second broadcast signal to deliver the received broadcast signal to the receiver 200. In this case, the broadcast signal receiving device may be implemented in the form of a universal serial bus (USB) dongle and the receiver 200 may be a USB connector to which the broadcast signal receiving device is connected. Also, the receiver 200 transmits protocol information about protocol of the received broadcast signal to the controller 207.

The communicator 205 may be a transceiver (transmitter and receiver) or communication interface. The communicator 205 is configured to be connectable to the network 10 and receives the third broadcast signal from the third broadcast transmitter 40. Under a control of the controller 207, the communicator 205 receives the third broadcast signal of a channel selected by the user. The communicator 205 includes at least one connector or terminal corresponding to various standards. To connect with the network 10, the communicator 205 may perform wired network communication of environment, such as local area network (LAN). Alternatively, to perform connection with the network 10, the communicator 205 may perform wireless network communication, such as wireless fidelity (Wi-Fi), ultra-wide band (UVM), etc. Besides, to perform wireless communication with an external apparatus, the communicator 205 may include a radio frequency (RF) circuit for transmitting and receiving a RF signal, and may be configured to communicate using at least one of near field communication (NFC) or wireless USB. The third broadcast signal may be a broadband signal, which complies with, for example, the ATSC 3.0 standard. However, the standard of the third broadcast signal according to an embodiment is not limited thereto.

The user input receiver receives a user input to transmit to the controller 207. The user input receiver may be implemented in many types according to methods of the user input. For example, the user input receiver may be implemented as a menu button installed on an outer side the electronic apparatus 1, a remote control signal receiver to receive a remote control signal corresponding to the user input from a remote controller, a touch screen provided on the display 203 to receive a touch input of the user, a camera to sense a gesture input of the user, a microphone to recognize a voice input of the user, a sensor to detect a motion or position of the user, etc. The user input includes a channel selection command to select one from among a plurality of channels of broadcast signal.

The storage 209 is configured to store various data of the electronic apparatus 1. The storage 209 may be materialized by a non-volatile memory, such as a flash memory, an EPROM, an EEPROM, a hard disc driver, etc. if the second broadcast signal includes a file, the storage 209 may store the file of the second broadcast signal extracted by the signal processor 201.

Under the control of the controller 207, the signal processor 201 performs a signal processing process with respect to the broadcast signal received via the receiver 200 and/or the communicator 205 and outputs the processed signal to the display 203 to display an output image on the display 203. The signal processing process, which is performed by the signal processor 201, may include, for example, extracting a content signal, service information and the like from the broadcast signal, demultiplexing to divide the extracted content signal into subordinate streams, which includes video, audio and additional data, respectively, de-interlacing to convert an interlace type image signal into a progressive type image signal, scaling to change the image signal in definition, noise reduction for enhancing image quality, detail enhancement, frame refresh rate conversion, etc. The signal processor 201 may be implemented as at least one processor, which executes at least one program for executing the signal processing process as described above.

The signal processor 201 according to an embodiment is configured to extract the content and playback information included in the broadcast signal and decode the content based on the playback information. The extraction of the content and the playback information is performed as a preprocess corresponding to the protocol of the broadcast signal, and a signal mode of decoding may be performed with respect to the content regardless of the protocol.

As another embodiment, the signal processor 201 may be configured to perform the preprocess corresponding to the protocol of the broadcast signal and the decoding corresponding to the protocol with respect to the broadcast signal to extract the content.

The controller 207 performs controls needed for operating all the elements of the electronic apparatus 1. The controller 207 may include a control program for controlling to perform the control operations, a non-volatile memory in which the control program is installed, a volatile memory in which at least one of the control program is loaded, and at least one microprocessor (hereinafter, also referred to a 'processor') or central processing unit (CPU) for executing the loaded control program. The control program may include a program (or programs) which is implemented in the form of at least one of a BIOS, a device driver, an operating system, a firmware, a platform, and an application program (application). As an embodiment, the application program may be installed or stored in advance in the electronic apparatus 1 in manufacturing, or installed in the electronic apparatus 1 based on data for the application program received from the external in use. The data for the application program may be downloaded to the electronic apparatus 1 from an external server, such as, for example, an application market or the like. The signal processor 201 and the controller 207 may be implemented by individual processors, respectively, or a single processor in which two constructions thereof are integrated. Alternatively, a processor corresponding to the controller 207 may be implemented to perform at least a portion of a function of the signal processor 201 or vice versa.

Based on protocol information of the broadcast signal delivered from the receiver 200, the controller 207 identifies whether the received broadcast signal is the first broadcast signal of the first protocol or the second broadcast signal of the second protocol. The controller 207 controls the signal processor 201 to perform a preprocess corresponding to the first protocol with respect to the first broadcast signal if the received broadcast signal is the first broadcast signal, and a preprocess corresponding to the second protocol with respect to the second broadcast signal if the received broadcast signal is the second broadcast signal. Then, the controller 207 controls the signal processor 201 to perform the decoding with respect to the content included in the broadcast signal based on the playback information from the broadcast signal.

According to the embodiment, the electronic apparatus 1 processes the first broadcast signal and the second broadcast signal in the same method. Accordingly, there is no need for the electronic apparatus 1 to be provided with the local HTTP server and any cumbersome and inefficient process, which stores the content in the HTTP server and download and play the content using the playback information, is omitted, thereby providing enhanced signal processing efficiency.

Figure 3:
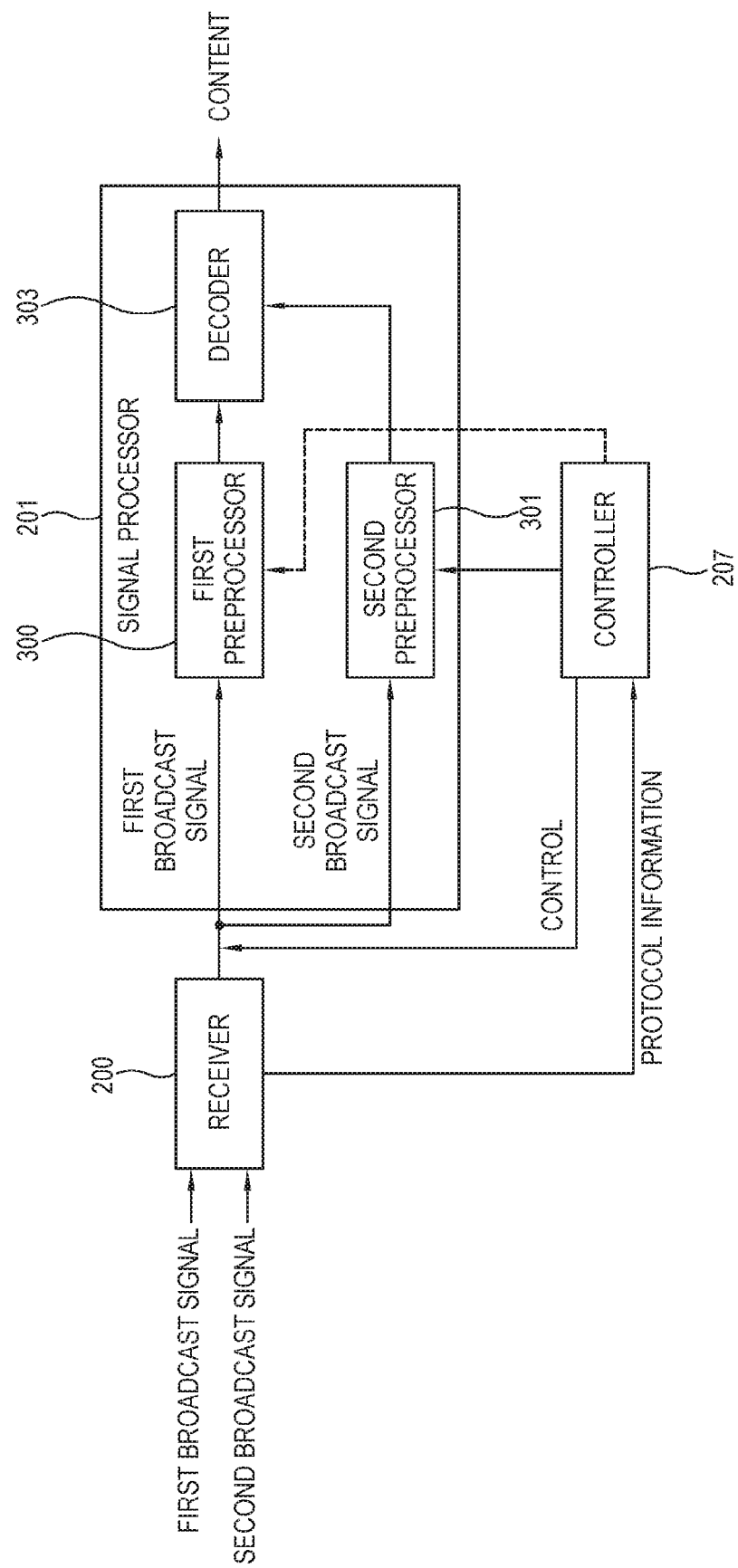
FIG. 3 illustrates a broadcast signal processing process of an signal processor according to an embodiment.

FIG. 3 illustrates a broadcast signal processing process of the signal processor according to an embodiment.

The receiver 200 transmits protocol information of the received broadcast signal to the controller 207. The controller 207 identifies whether received broadcast signal is a first broadcast signal or a second broadcast signal based on the protocol information. Then, based on the identification, the controller 207 controls the signal processor 201 to perform a process corresponding to a protocol of the identified broadcast signal.

Under the control of the controller 207, the signal processor 201 performs a preprocess corresponding to the first protocol or the second protocol with respect to the received broadcast signal, decodes a content of the broadcast signal to which the preprocess is performed to output the decoded content, and outputs the decoded content. For this, the signal processor 201 may include a first preprocessor 300, a second preprocessor 301 and a decoder 303.

Each of the first preprocessor 300 and the second preprocessor 301 extracts the content from the broadcast signal of corresponding protocol, and transmits the extracted content to the decoder 303. The decoder 303 decodes the content extracted by the first preprocessor 300 or the second preprocessor 301 to comply with a format thereof and transmits the decoded content to the display 203. In an embodiment, the decoder 303 performs a single mode of decoding with respect to the extracted content regardless of the protocols of the broadcast signals.

According to an embodiment, a plurality of decoders 303 corresponding to the broadcast signals, respectively, may be provided. This will be described later.

Figure 4:
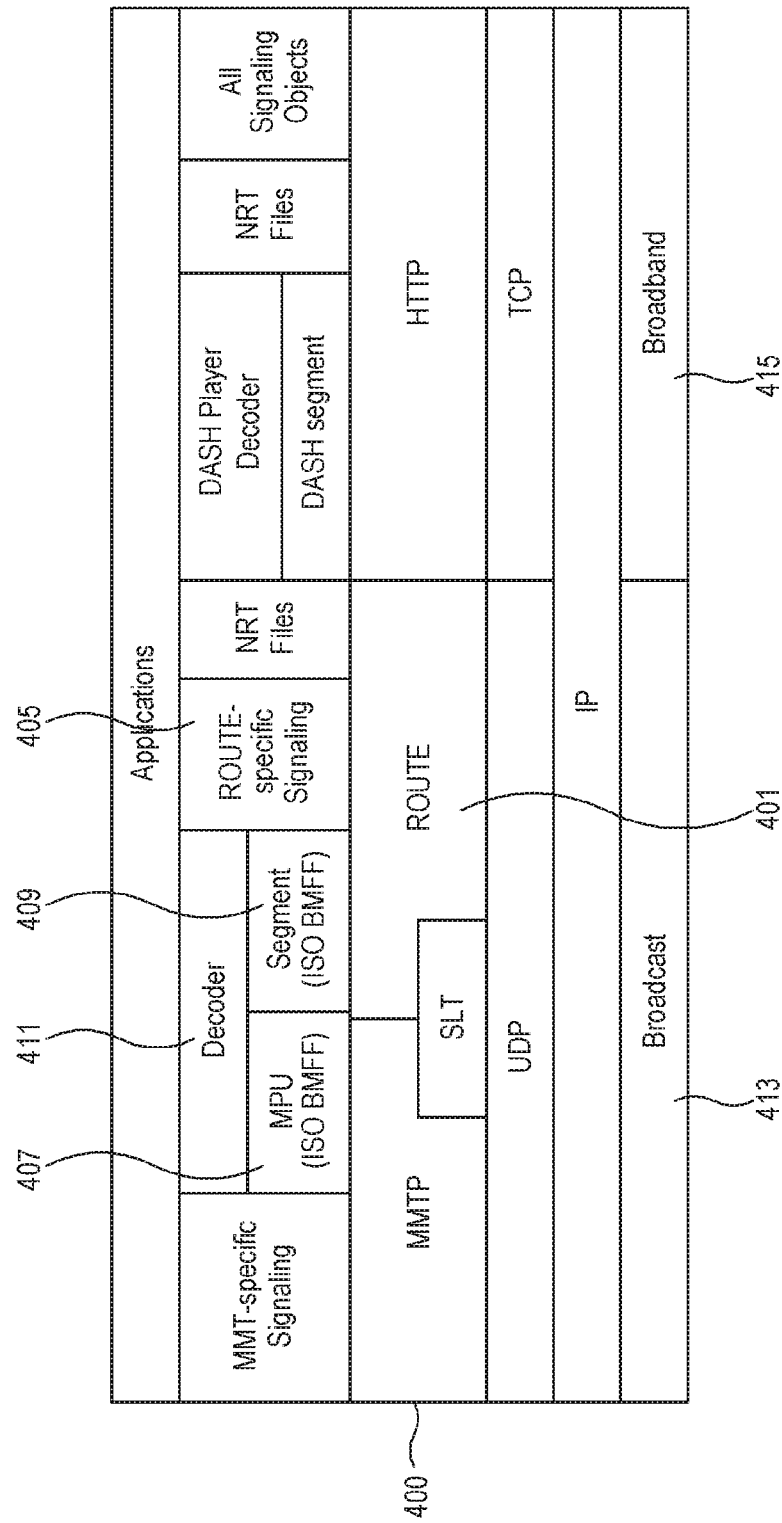
FIG. 4 is a block diagram illustrating a configuration of a broadcast signal according to an embodiment.

FIG. 4 is a block diagram illustrating a configuration of the broadcast signals according to an embodiment. The broadcast signals according to an embodiment may comply with, for example, the ATSC 3.0 standard. The first broadcast signal and the second broadcast signal according to an embodiment are broadcast signals. The first broadcast signal corresponds to a MMTP protocol 400 and the second broadcast signal corresponds to a ROUTE protocol 401. The third broadcast signal as a broadband signal corresponds to a HTTP protocol.

Information for receiving the first broadcast signal and the second broadcast signal is included in a service list table (SLT). The SLT may include a media presentation description (MPD), which is playback information of the second broadcast signal. The MPD may include a playback time point of the content, a playback time of the content, index information of the content, codec information of the content, etc. the signal processor 201 extracts information about the playback time of the content from the MPD of the second broadcast signal.

If the first broadcast signal is received, the signal processor 201 performs a preprocess corresponding to the first protocol of the first broadcast signal to extract a media processing unit (MPU) 407 including the content. The MPU 407 of the first broadcast signal may include information about the playback time of the content. If the second broadcast signal is received, the signal processor 201 performs a preprocess corresponding to the second protocol of the second broadcast signal to extract a segment 409 including the content. And then the signal processor 201 performs a decoding with respect to the MPU 407 or the segment 409 to transmit decoded content thereof to the display 203. The signal processor 201 may perform the decoding with respect to the MPU 407 or the segment 409 based on playback information of the contents thereof obtained corresponding to the respective protocols of the broadcast signals.

The segment 409 of the second broadcast signal as an ISO base media file format (ISOBMFF) includes an init segment in which a ftyp box and a mooy box are included and a media segment in which media data is included. The init segment always has a constant index value, and the media segment has an index value increased by one. The init segment and the media segment only come to a playable content by combining them.

As illustrated in FIG. 4, both the received first broadcast signal and the received second broadcast signal may be decoded according to a single decoding method by the same decoder 411. Decoded content is provided through the display 203.

Figure 5:
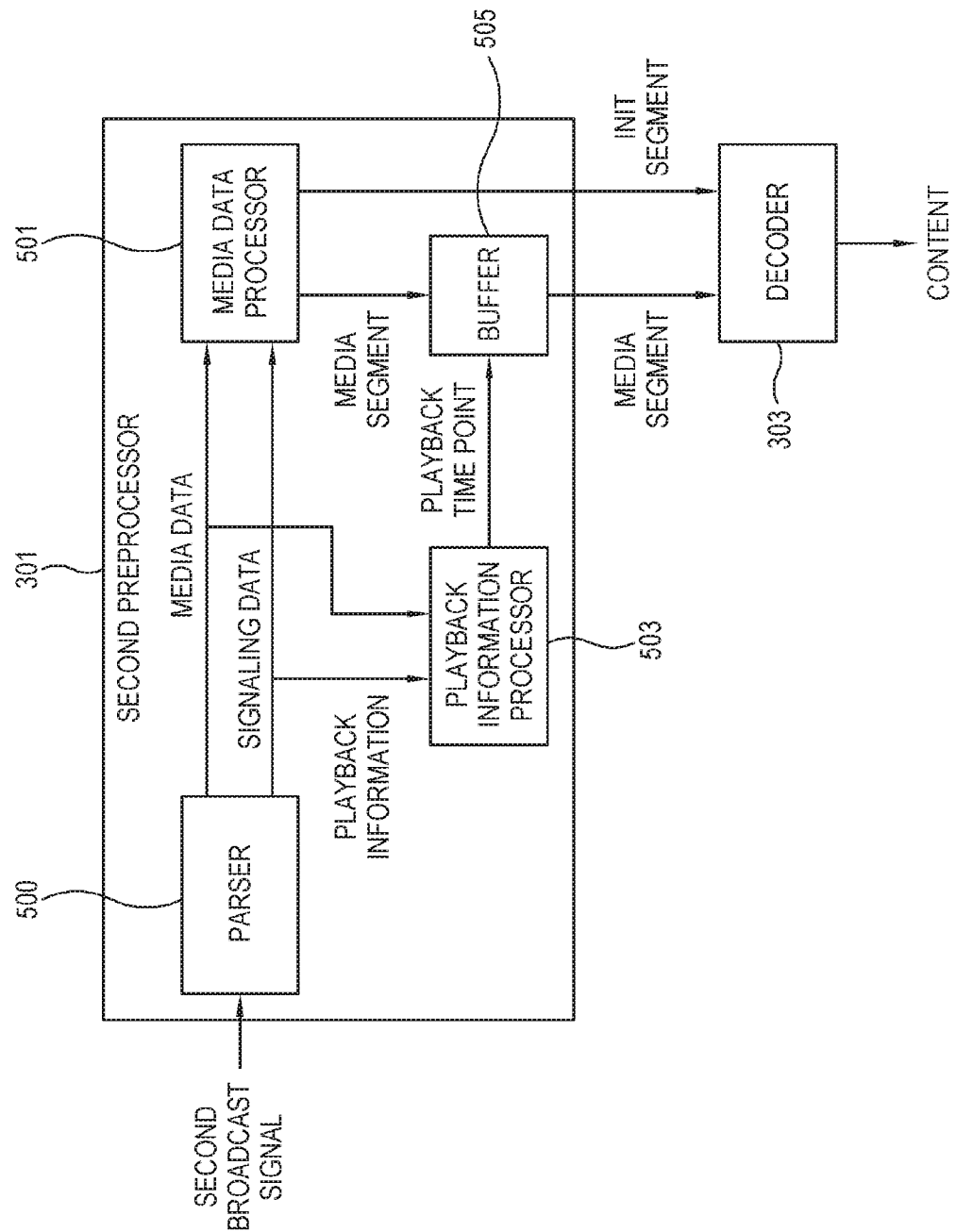
FIG. 5 illustrates a detailed operation of a second preprocessor according to an embodiment.

FIG. 5 illustrates a detailed operation of the second preprocessor according to an embodiment. The second preprocessor 301 may include a parser 500, a media data processor 501, a playback information processor 503 and a buffer 505. The drawing does not limit a configuration of the second preprocessor 301 according to an embodiment. Each element of the illustrated second preprocessor 301 may be omitted or implemented as further including any unillustrated configuration.

The parser 500 extracts and provides media data and signaling data included in the second broadcast signal. The media data processor 501 extracts a media segment and an init segment from the provided media data and transmits the media segment to the buffer 505.

The playback information processor 503 extracts playback information from the media data and the signaling data, and extracts information about a playback time point of the content based on the playback information. The playback information processor 503 transmits the extracted information about the playback time point of the content to the buffer 505.

The buffer 505 transmits a media segment of a time point to be played to the decoder 303 based on the information about the playback time point.

In other words, according to an embodiment, even though the content is not requested from the HTTP server using the MPD, the content and the playback time point are extracted from the received broadcast signal to provide the content to comply with the playback time point, thereby skipping any unnecessary step, which stores the media data and the playback information in the server and accesses to the server to download the content.

Figure 6:
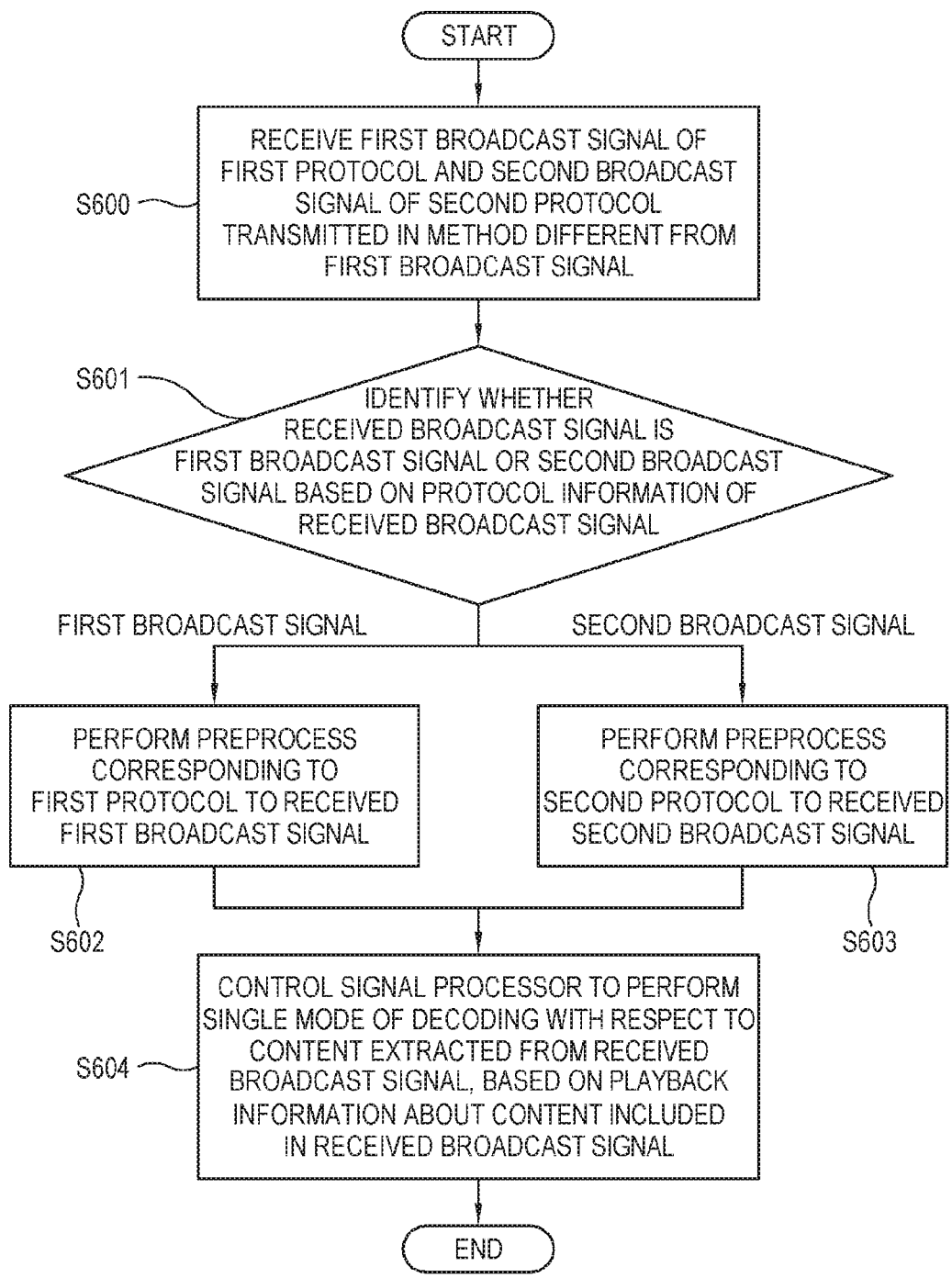
FIG. 6 is a flowchart illustrating a control method of the electronic apparatus according to an embodiment
Figure 7:
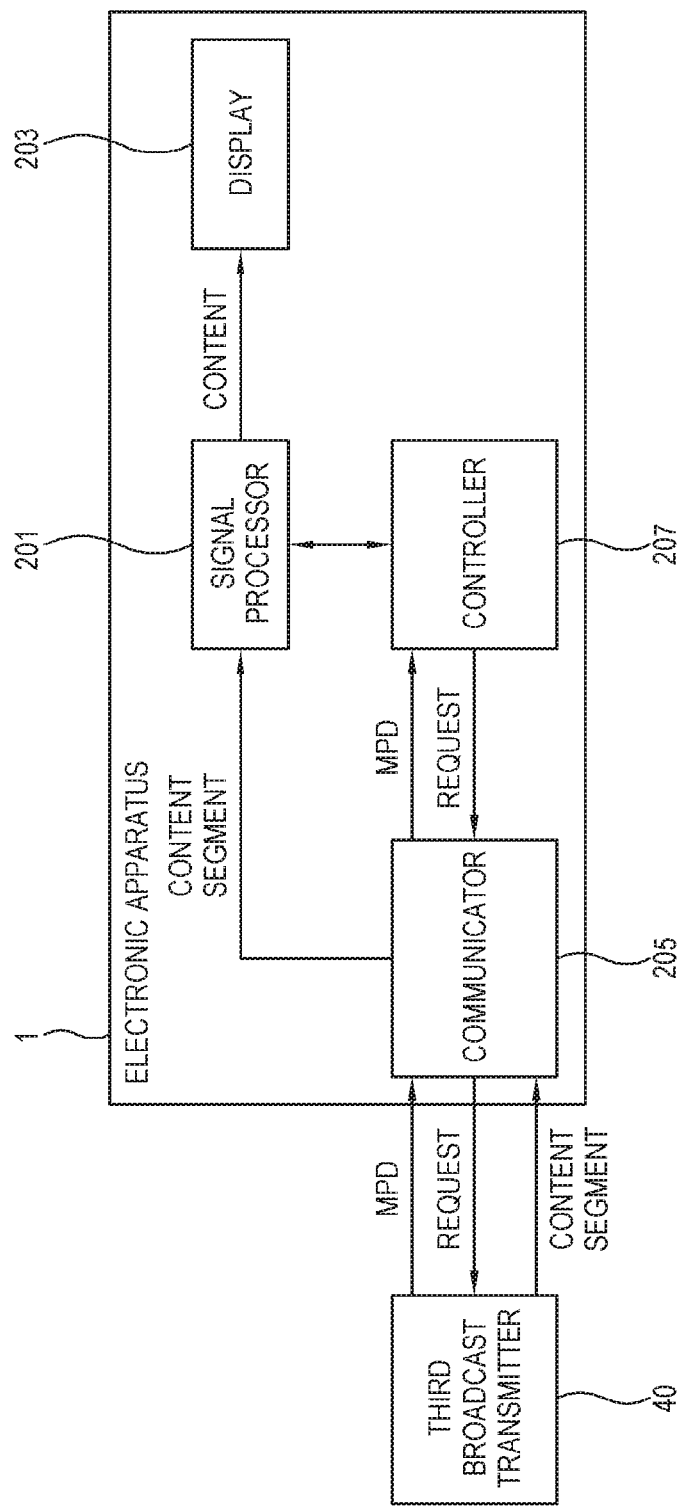
FIG. 7 illustrates a processing process of a third broadcast signal according to an embodiment.

FIG. 6 is a flowchart illustrating a control method of the electronic apparatus according to an embodiment. First, at an operation S600, the receiver 200 receives a first broadcast signal of a first protocol or a second broadcast signal of a second protocol transmitted in a method different from the first broadcast signal. At an operation S601, the controller 207 identifies whether the received broadcast signal is the first broadcast signal or the second broadcast signal based on protocol information of the received broadcast signal. Based on the identification of the controller 207, if the received broadcast signal is the first broadcast signal, at an operation S602, the signal processor 201 performs a preprocess corresponding to the first protocol with respect to the first broadcast signal under a control of the controller 207. If the received broadcast signal is the second broadcast signal, at an operation S603, the signal processor 201 performs a preprocess corresponding to the second protocol with respect to the second broadcast signal under the control of the controller 207. Lastly, at an operation S604, under the control of the controller 207, the signal processor 201 performs a single mode of decoding with respect to a content extracted by performing the preprocess, based on playback information included in the received broadcast information FIG. 7 illustrates a processing process of the third broadcast signal according to an embodiment.

The third broadcast signal as a broadband signal may be transmitted via a HTTP protocol, as described above. The third broadcast transmitter 40 may transmit the third broadcast signal via the network 10. The electronic apparatus 1 includes the communicator 205 to receive the third broadcast signal. The third broadcast signal may be transmitted via digital subscriber line (DSL), optical communication, cable, cellular, wireless network, satellite, etc. According to an embodiment, the third broadcast signal via broadband includes a content and playback information of the content. Transmission and reception of the third broadcast signal are divided into transmission and reception of transmission packet including a real content and transmission and reception of the playback information of the content. The electronic apparatus receives the playback information of the content and the transmission packet including the content. The playback information of the content as information required to play the content includes at least one of spacial information and time information required to play the content. The playback information of the content also includes signaling information required to receive the transmission packet including the content. The playback information may include a URL address for a server that can receive the transmission packet. The electronic apparatus 1 receives and plays the content based on the playback information of the content.

As an example of the third broadcast signal, the electronic apparatus 1 receives a MPD, which is the playback information, from a server, which is the third broadcast transmitter 40, via the communicator 205. In FIG. 7, the server, which transmits the MPD and the content, is illustrated as the third broadcast transmitter 40, but the present disclosure is not limited thereto. A server, which transmits the MPD, and a content server, which transmits the content, may be different from each other.

The electronic apparatus 1 requests the third broadcast transmitter 40 for the content based on the received MPD. The electronic apparatus 1 receives transmission packet including the content as a result of the request. And then, the controller 207 controls the signal processor 201 and the display 204 to process and play the content based on the MPD. To play the content, the electronic apparatus 1 may include a DASH client.

Figure 8:
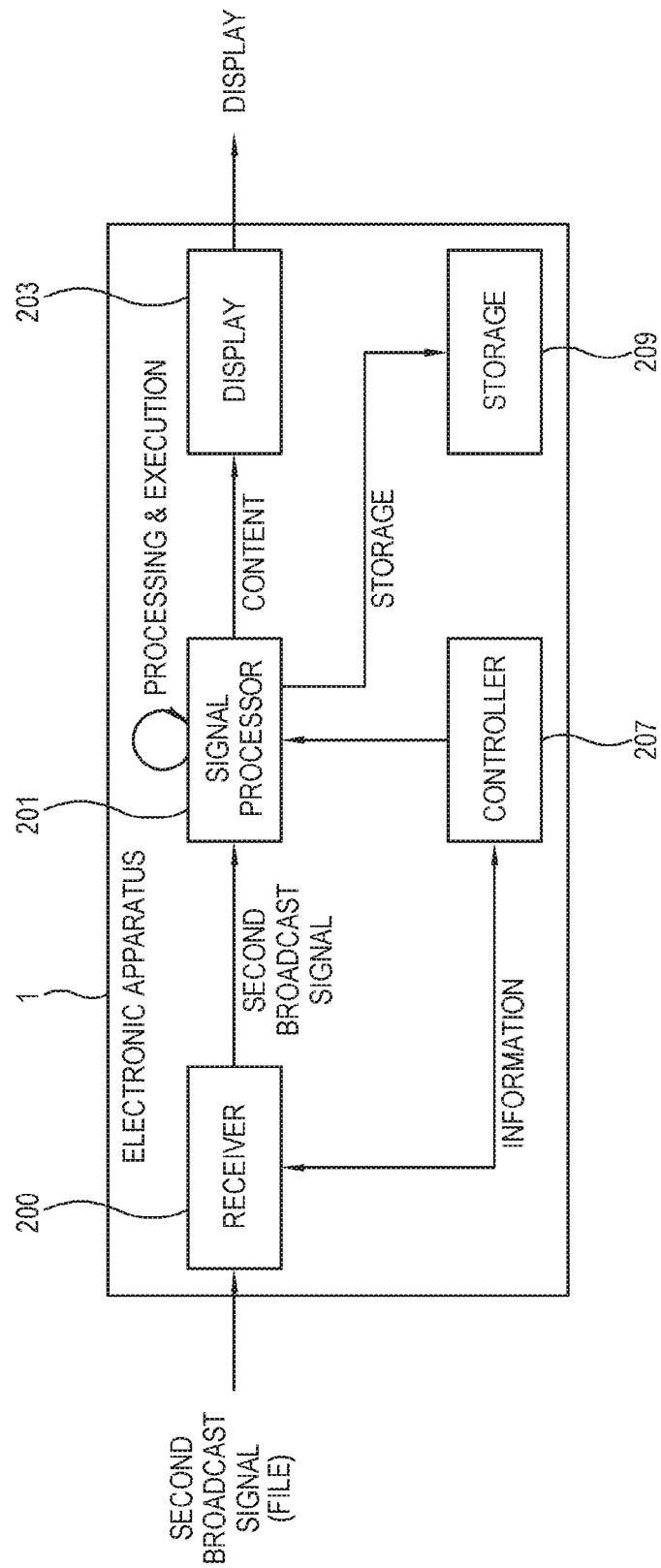
FIG. 8 illustrates a processing process of a file included in a second broadcast signal according to an embodiment.

FIG. 8 illustrates a processing process of a file included in the second broadcast signal according to an embodiment.

The second broadcast signal may include a non-real time (NRT) file. Like the media data, the NRT file is encapsulated and transmitted via user datagram protocol (UDP), IP layer or the like. The controller 207 identifies whether or not the received broadcast signal is the second broadcast signal based on protocol information of the received broadcast information, and whether or not content included on the second broadcast signal is the NRT file based on signaling information.

If the content included on the second broadcast signal is a real time media content, the controller 207 is operated to extract information about playback time point, to extract media segment and to decode and play the media segment based on the information about playback time point, as described above.

If the content included on the second broadcast signal is a NRT file, the controller 207 controls the signal processor 201 to extract the included file, to execute the extracted file, and to display the content on the display 203 based on the execution or store the content in the storage 209.

Figure 9:
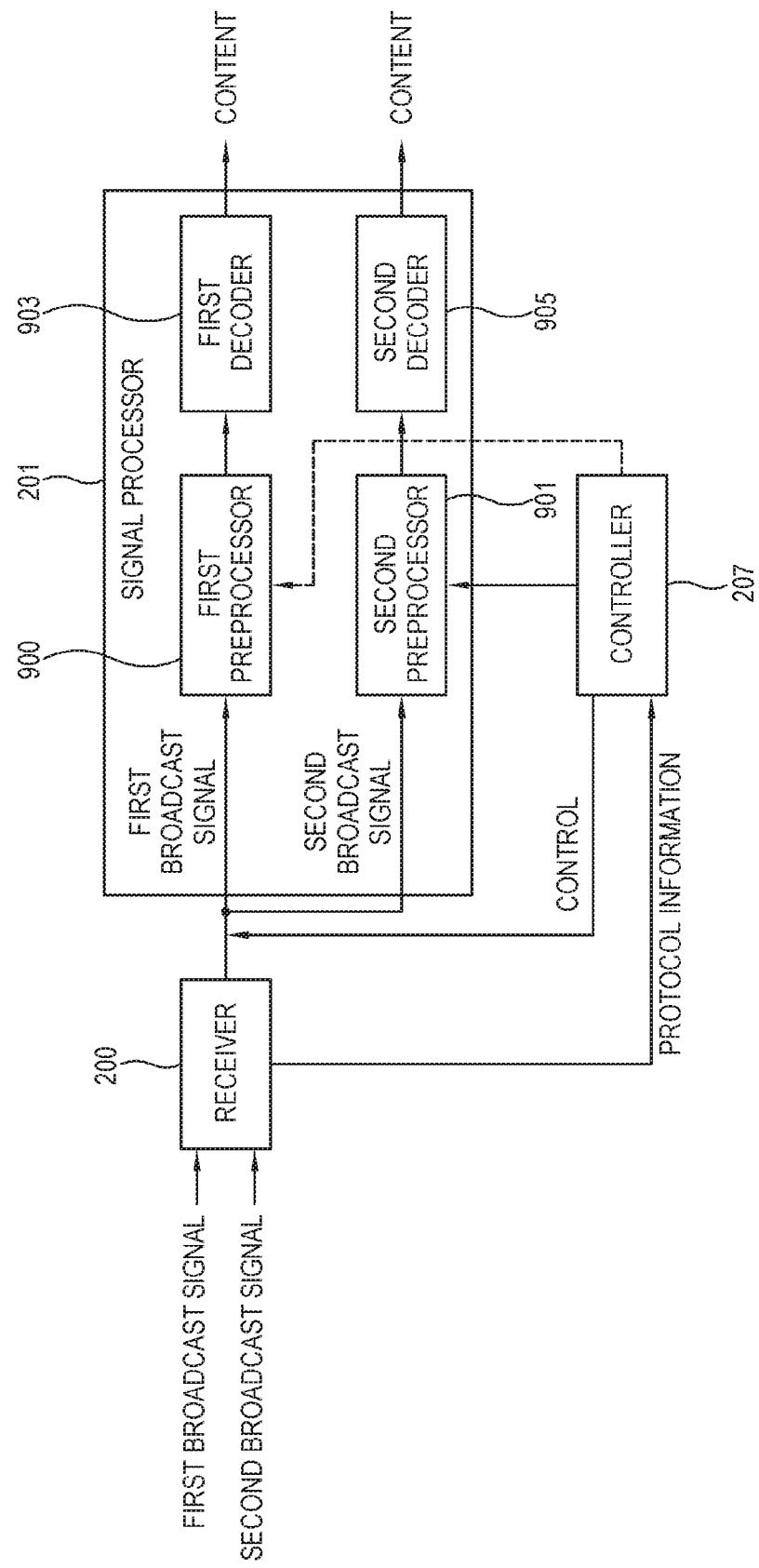
FIG. 9 illustrates a broadcast signal processing process of an signal processor including a plurality of decoders according to another embodiment.
Figure 10:
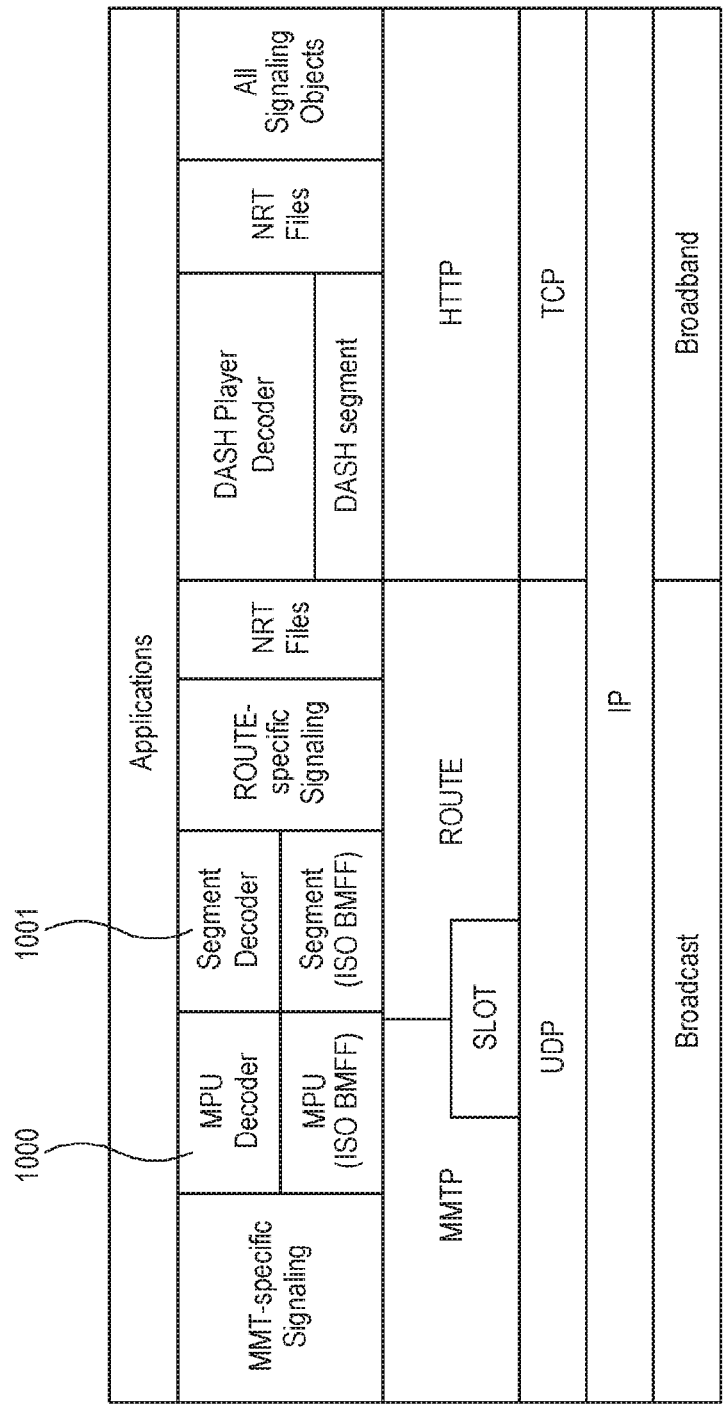
FIG. 10 is a block diagram illustrating a configuration of a broadcast signal according to another embodiment.

FIG. 9 illustrates a broadcast signal processing process of a signal processor including a plurality of decoders according to another embodiment, and FIG. 10 is a block diagram illustrating a configuration of a broadcast signal according to another embodiment.

The controller 207 identifies whether a broadcast signal received via the receiver 200 is a first broadcast signal or a second broadcast signal based on protocol information of the received broadcast signal. And then, the controller 207 controls the signal processor 201 to perform a preprocess corresponding to a protocol of the first or second broadcast signal based on the identification.

The signal processor 201 performs a first preprocess or a second preprocess with respect to the received broadcast signal under the control of the controller 207. To this end, the signal processor 201 includes a first preprocessor 900 and a second preprocessor 901.

If the received broadcast signal is the first broadcast signal, the first preprocessor 900 performs the first preprocess with respect to the first broadcast signal. Then, a content of the first broadcast signal decoded by a first decoder 903 to transmit to the display 203.

If the received broadcast signal is the second broadcast signal, the second preprocessor 901 performs the second preprocess with respect to the second broadcast signal. The second preprocessor 901 includes a parser 500 to extract media data and signaling data from the second broadcast signal, a media data processor 501 to process the media data to extract a media segment and to transmit the media segment to a buffer 505, a playback information processor 503 to extract a playback time point of a content based on playback information of the signaling data and to transmit the playback time point of the content to the buffer 505, and a buffer 505 to transmit the media segment to a second decoder 905 based on the playback time point of the content. The second decoder 905 receives the media segment from the buffer 505 of the second preprocessor 901, decodes the received media segment and transmits decoded content of the second broadcast signal to the display 203.

FIG. 10 is a block diagram of the broadcast signal indicating that respective broadcast signals can be decoded by decoders 1000 and 1001 corresponding to corresponding protocols.

As described above, according to the embodiments, the received broadcast signal is processed and the content is provided without unnecessary processes, thereby enhanced signal processing efficiency.

While embodiments have been shown and described, it will be understood by those skilled in the art that various changes in form and details may be made therein without departing from the present disclosure as defined by the appended claims and their equivalents.

What is claimed is:

1. An electronic apparatus comprising:
a receiver configured to receive a first broadcast signal of a first protocol and a second broadcast signal of a second protocol, the first broadcast signal being transmitted according to a first method and the second broadcast signal being transmitted according to a second method that is different from the first method;
a signal processor configured to process a content included in a received broadcast signal;
a display configured to display the processed content; and
a controller configured to identify, based on protocol information of the received broadcast signal, whether the received broadcast signal is the first broadcast signal of the first protocol or the second broadcast signal of the second protocol,
wherein the signal processor is further configured to:
perform, based on the controller identifying that the received broadcast signal is the first broadcast signal, a first preprocess corresponding to the first protocol to the first broadcast signal to obtain first preprocessed content,
perform, based on the controller identifying that the received broadcast signal is the second broadcast signal, a second preprocess corresponding to the second protocol to the second broadcast signal to obtain second preprocessed content, and
perform a single mode of decoding with respect to the first preprocessed content based on the first preprocessed content being provided and the second preprocessed content based on the second preprocessed content being provided.

2. The electronic apparatus according to claim 1, wherein the controller is further configured to control the signal processor to extract content data and playback information about the content from the second broadcast signal, extract a playback time point of the content data from the playback information, and provide the content data corresponding to the playback time point as the second preprocessed content.

3. The electronic apparatus according to claim 2, wherein the playback information extracted from the second broadcast signal comprises at least one of a playback start time of the content data, a total playback time of the content data, index information of the content data, and codec information of the content data.

4. The electronic apparatus according to claim 2, wherein the content data comprises an initialization segment, a media segment and an index segment.

5. The electronic apparatus according to claim 1, wherein the controller is further configured to, based on a file being included in the second broadcast signal, control the signal processor to extract the file and execute instructions of the file.

6. The electronic apparatus according to claim 1, further comprising:
a communicator configured to receive a third broadcast signal transmitted via a network from an external server,
wherein the controller is further configured to request, based on third broadcast playback information included in the third broadcast signal, the external server to send a third broadcast content corresponding to the third broadcast playback information, and control the signal processor to process the third broadcast content received according to the request.

7. The electronic apparatus according to claim 1, wherein the first protocol corresponds to an MPEG media transport protocol (MMTP) method and the second protocol corresponds to a real time object delivery over unidirectional transport (ROUTE) method.

8. The electronic apparatus according to claim 7, wherein the signal processor is further configured to perform the second preprocess without using a dynamic adaptive streaming over HTTP (DASH) player.

9. The electronic apparatus according to claim 1, wherein the signal processor is further configured to obtain playback information and media data from the second broadcast signal, and identify a media segment from the media data based on the playback information,
wherein the second preprocessed content comprises the media segment.

10. The electronic apparatus according to claim 1, wherein the signal processor is further configured to:
obtain playback information and media data from the second broadcast signal,
identify a playback time point based on the playback information,
provide a media segment from the media data based on the playback time point as the second preprocessed content.

11. A control method of an electronic apparatus, the control method comprising:
receiving a first broadcast signal of a first protocol and a second broadcast signal of a second protocol, the first broadcast signal being transmitted according to a first method and the second broadcast signal being transmitted according to a second method different that is from the first method;
processing a content included in a received broadcast signal; and
displaying the processed content,
wherein the processing comprises:
identifying, based on protocol information of the received broadcast signal, whether the received broadcast signal is the first broadcast signal of the first protocol or the second broadcast signal of the second protocol,
performing, based on the received broadcast signal being identified as the first broadcast signal, a first preprocess corresponding to the first protocol to the first broadcast signal to obtain first preprocessed content,
performing, based on the received broadcast signal being identified as the second broadcast signal, a second preprocess corresponding to the second protocol to the second broadcast signal to obtain second preprocessed content, and
performing a single mode of decoding with respect to the first preprocessed content based on the first preprocessed content being provided and the second preprocessed content based on the second preprocessed content being provided.

12. The control method according to claim 11, wherein the performing the second preprocess corresponding to the second protocol to the second broadcast signal comprises extracting content data and playback information about the content from the second broadcast signal, extracting a playback time point of the content data from the playback information, and providing the content data corresponding to the playback time point as the second preprocessed content.

13. The control method according to claim 12, wherein the playback information extracted from the second broadcast signal comprises at least one of a playback start time of the content data, a total playback time of the content data, index information of the content data, and codec information of the content data.

14. The control method according to claim 12, wherein the content data comprises an initialization segment, a media segment and an index segment.

15. The control method according to claim 11, wherein the processing the content included in the received broadcast signal comprises extracting, based on a file being included in the second broadcast signal, and executing instructions of the file.

16. The control method according to claim 11, further comprising:
receiving a third broadcast signal transmitted via a network from an external server;
requesting, based on third broadcast playback information included in the third broadcast signal, the external server to send a third broadcast content corresponding to the third broadcast playback information; and
processing the third broadcast content received according to the request.

17. The control method according to claim 11, wherein the first protocol comprises a MPEG media transport protocol (MMTP) method and the second protocol comprises a real time object delivery over unidirectional transport (ROUTE) method.

18. A non-transitory computer readable medium having a computer program stored thereon, the computer program containing one or more instructions, which, when executed by a computing device, cause the computing device to execute a control method including:
receiving a first broadcast signal of a first protocol and a second broadcast signal of a second protocol, the first broadcast signal being transmitted according to a first method and the second broadcast signal being transmitted according to a second method that is different from the first method;
processing a content included in a received broadcast signal; and
displaying the processed content,
wherein the processing comprises:
identifying, based on protocol information of the received broadcast signal, whether the received broadcast signal is the first broadcast signal of the first protocol or the second broadcast signal of the second protocol, performing, based on the received broadcast signal being identified as the first broadcast signal, a first preprocess corresponding to the first protocol to the first broadcast signal based on the received broadcast signal being the first broadcast signal to obtain first preprocessed content, performing, based on the received broadcast signal being identified as the second broadcast signal, a second preprocess corresponding to the second protocol to the second broadcast signal to obtain second preprocessed content, and performing a single mode of decoding with respect to the first preprocessed content based on the first preprocessed content being provided and the second preprocessed content based on the second preprocessed content being provided.

19. The non-transitory computer readable medium of claim 18, wherein the non-transitory computer readable medium is included in a server, and wherein the computer program is downloaded over a network to the computing device.

* * * * *